(12) United States Patent
Tingley

(10) Patent No.: US 6,736,052 B2
(45) Date of Patent: May 18, 2004

(54) INDUSTRIAL BAKING TRAY

(75) Inventor: Jason Tingley, Enon, OH (US)

(73) Assignee: American Pan Company, Urbana, OH (US)

( * ) Notice: Subject to any disclaimer, the term of this patent is extended or adjusted under 35 U.S.C. 154(b) by 0 days.

(21) Appl. No.: 10/152,702

(22) Filed: May 22, 2002

(65) Prior Publication Data

US 2003/0217646 A1 Nov. 27, 2003

(51) Int. Cl.[7] ................................................. A47J 43/00
(52) U.S. Cl. ..................... 99/426; 99/428; 99/DIG. 15; 220/573.1; 220/912
(58) Field of Search ........................... 99/426, 428, 432, 99/DIG. 15, 448; 220/573.1, 912, 743, 756

(56) References Cited

U.S. PATENT DOCUMENTS

| | | | | |
|---|---|---|---|---|
| 883,296 A | * | 3/1908 | Cook | .................... 99/DIG. 15 |
| 4,662,273 A | * | 5/1987 | Marchioni | .................... 99/426 |
| 5,361,687 A | * | 11/1994 | deVries | ........................ 99/426 |
| 6,213,005 B1 | * | 4/2001 | Sherman et al. | ............... 99/426 |

* cited by examiner

Primary Examiner—Reginald L. Alexander
(74) Attorney, Agent, or Firm—Calfee, Halter & Griswold LLP; Courtney J. Miller

(57) ABSTRACT

A structurally reinforced, durable baking tray for use in high-volume industrial baking applications. The baking tray of the present invention includes a baking surface, the perimeter of which is encircled by a band of material that is partially rolled down and away from the baking surface to define the outer edge of the tray. At least one lengthwise support rib is formed in the baking surface and connects with the band of material at both ends of the baking tray. At least one widthwise support rib is also formed in the baking surface. This widthwise rib intersects the lengthwise support rib and connects with the band of material on both sides of said baking tray. The intersecting support ribs pass completely through the length and width of the baking tray and join with the band of material encircling the baking surface, thereby conferring structural stability, rigidity, and durability to the tray.

4 Claims, 5 Drawing Sheets

INDUSTRIAL BAKING TRAY

BACKGROUND OF THE INVENTION

The present invention relates generally to pans or trays used in the production of baked goods, and specifically to a structurally reinforced baking tray for use in high-volume industrial baking applications.

Baking pans or trays are commonly used by producers of various baked goods that are supplied to restaurants and grocery stores. Because producers of baked goods often supply large quantities of baked goods to their customers, the trays such goods are baked on are reused many times and are repeatedly subjected to both high thermal and mechanical stresses. Baking pans are often stacked on top of one another, and it is common for a stack of baking pans to include more than fifty pans. Stacking pans in this manner creates significant pressure on the bottom pan in a stack, and the weight on the bottom pan may be as much as 500 pounds. Thus, repeated use and repeated exposure to high temperatures and mechanical stress requires that an industrial baking tray be manufactured from a durable material such as steel or aluminum.

Although manufacturing a baking tray from materials such as steel or aluminum does increase the lifespan of the tray, additional features may be included to lend strength and stability, particularly when the tray is large in size. One approach to adding strength and durability has been the inclusion of support ribs on the interior portion of the pan between indentations or depressions where dough is placed prior to baking. Such ribs may partially run across the length of pan, across the width of a pan, or both. While somewhat effective at increasing the overall strength of the pan, these support ribs do not prevent warping and may actually create stress points at the intersections of the ribs. Repeated use, re-glazing, or other physical or chemical stressors eventually weakens the metal of the tray and cracks or fractures may appear in the metal surface of the tray. Once a tray has sustained such damage, it is no longer useable and must be discarded. Due to the expense of replacing industrial baking trays, there is a need for a baking tray that includes features that provide strength and stability, but that reduce the potential for damage caused by fractures in the metal of the tray.

SUMMARY OF THE INVENTION

An exemplary embodiment of this invention provides a structurally reinforced, durable baking tray for use in high-volume industrial baking applications. The baking tray of the present invention includes a baking surface that is encircled by a band of material that has been fabricated separately from the baking surface, but that has been wrapped with the metal of the baking surface to form a continuous metal surface. The topmost portion of this band is rolled down and away from the baking surface to define the outer edge of the tray. At least one lengthwise support rib is formed in the baking surface and runs through the baking surface such that the lengthwise support rib connects with the band of material at both ends of the baking tray. Additionally, at least one widthwise support rib is formed in the baking surface and runs through the baking surface such that this support rib intersects the lengthwise support rib and connects with the band of material on both sides of the baking tray. The combination of the band of material encircling the baking surface and the lengthwise and widthwise support ribs that intersect with one another and connect with the outer or perimeter band results in a baking tray that is structurally very strong, and consequently, very durable.

In an exemplary embodiment, the intersecting support ribs also create a plurality of baking subunits in the baking surface. Each of these baking subunits further includes a dough receptacle. Each dough receptacle further includes a plurality of wells that are partially separated from one another by protrusions in the baking surface and a dividing member located in the center of the wells.

The industrial baking tray of this invention may be fabricated from tin-plated steel, aluminized steel, carbonized steel, stainless steel, titanium, aluminum or any other suitable metal or metals. The tray may be fabricated from a single piece of starting material or may be fabricated as a composite of multiple materials. The surface of the tray may be covered with glazing material or a number of other materials that reduce sticking and/or increase or enhance the characteristics of the baking pan.

DETAILED DESCRIPTION OF THE INVENTION

Figure 1:
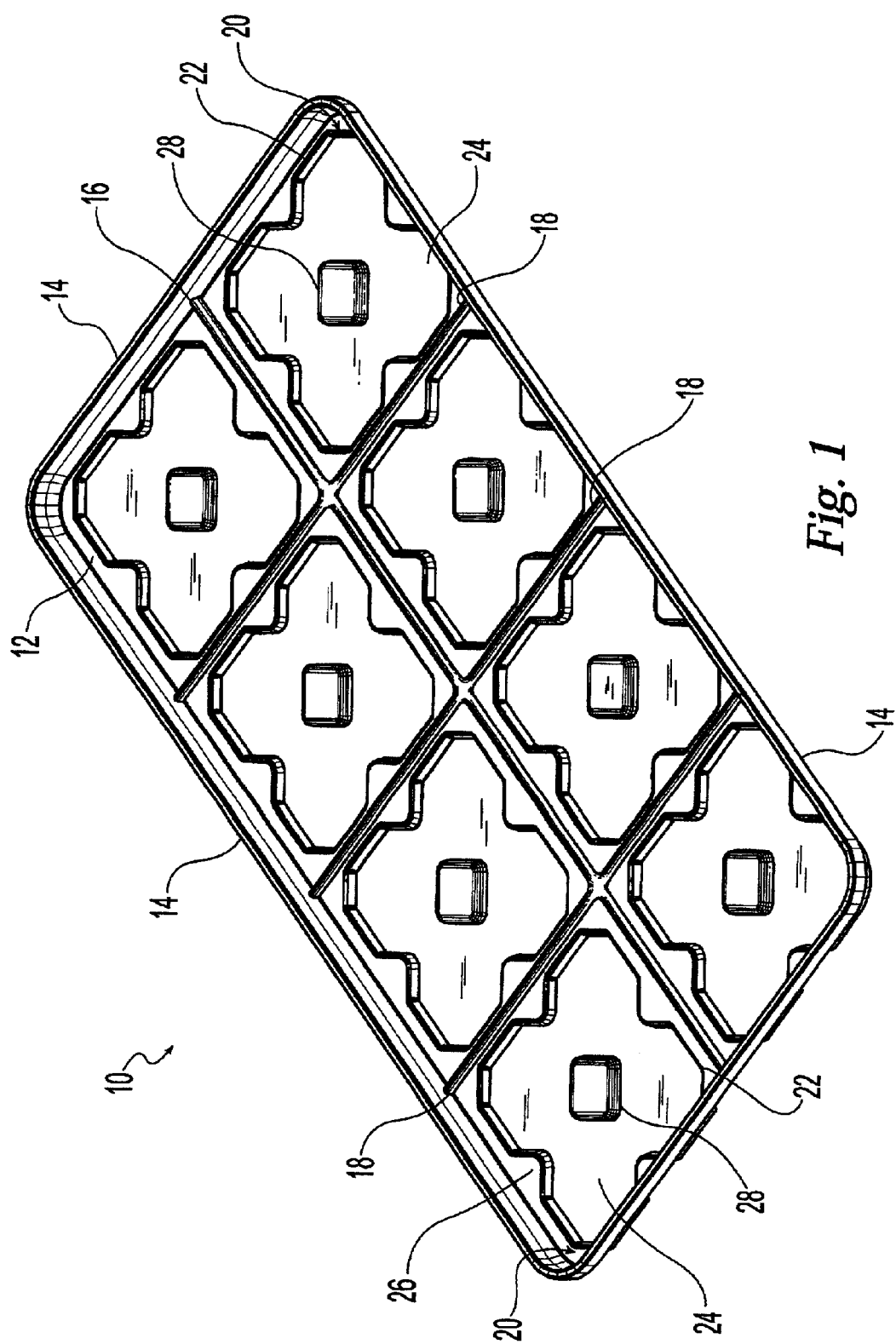
FIG. 1 is a perspective view of the baking tray of the present invention showing the perimeter band, center support ribs, sectional support ribs, and individual baking subunits.

| Reference Numerals | |
|---|---|
| 10 | baking tray |
| 12 | baking surface |
| 14 | perimeter band |
| 16 | lengthwise support rib |
| 18 | widthwise support ribs |
| 20 | baking subunit |
| 22 | dough receptacle |
| 24 | well |
| 26 | protrusion |
| 28 | dividing member |

Figure 2:
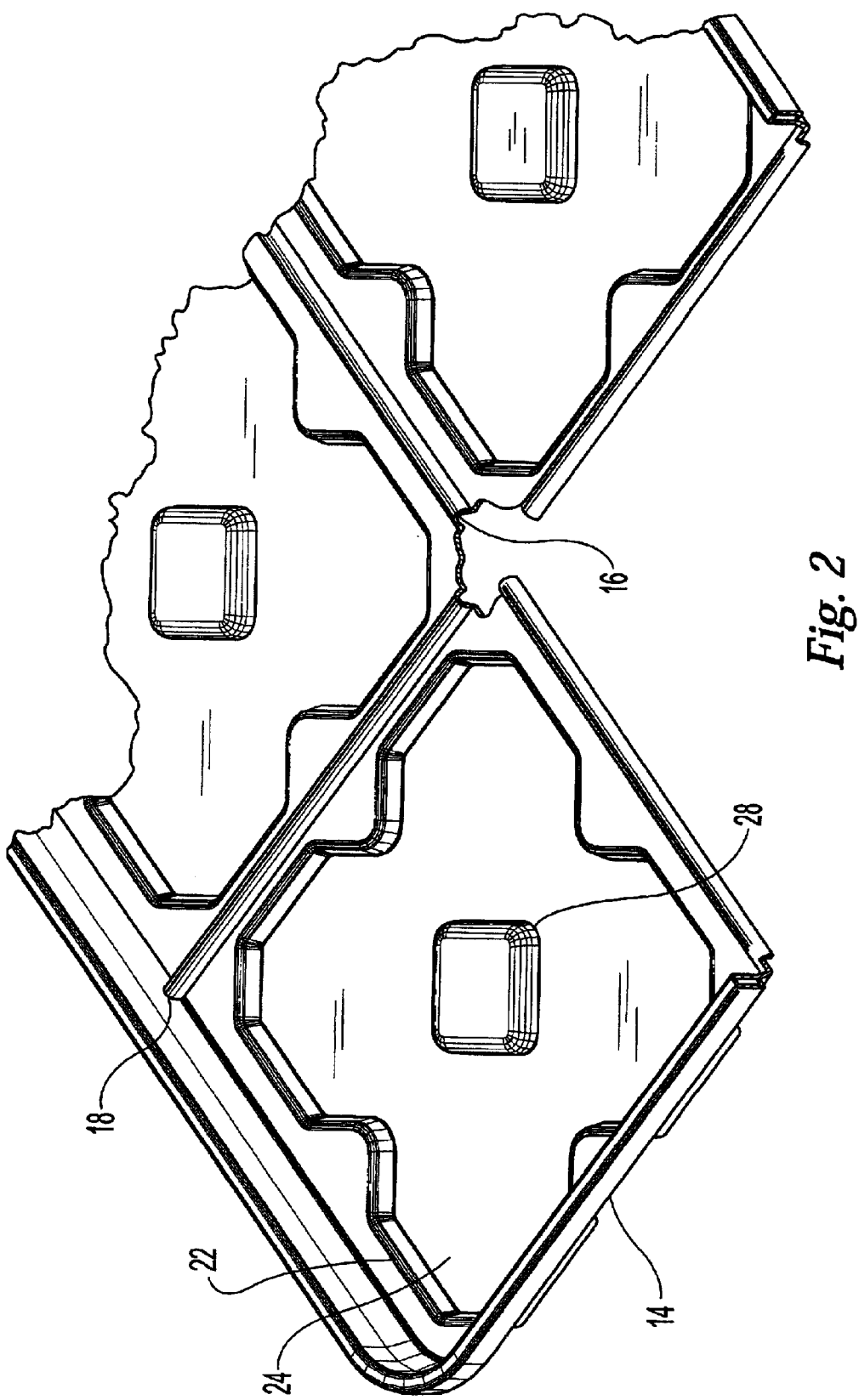
FIG. 2 is a cutaway perspective view of the baking tray of FIG. 1.
Figure 3:
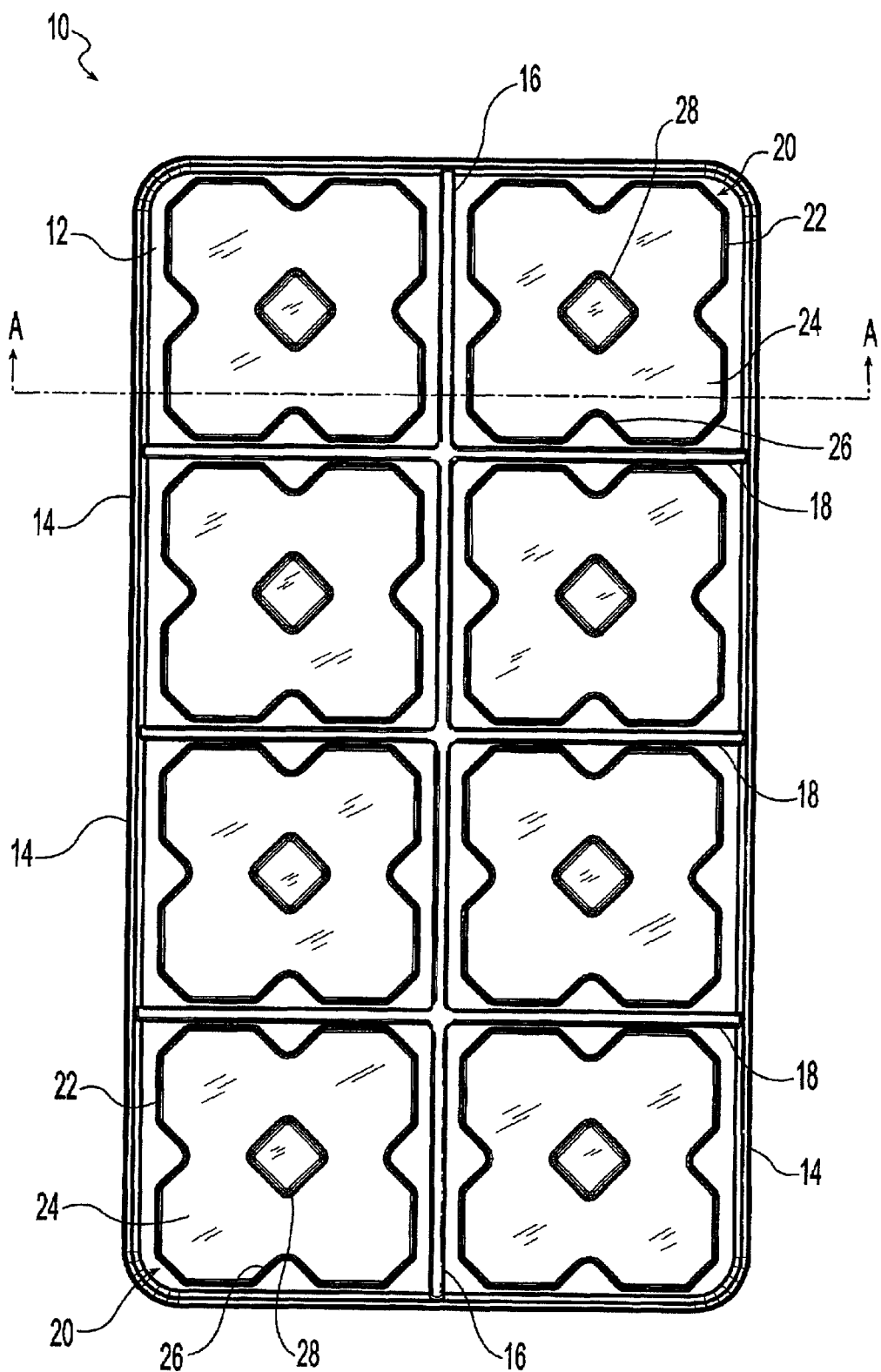
FIG. 3 is a top view of the baking tray of FIG. 1.
Figure 4:
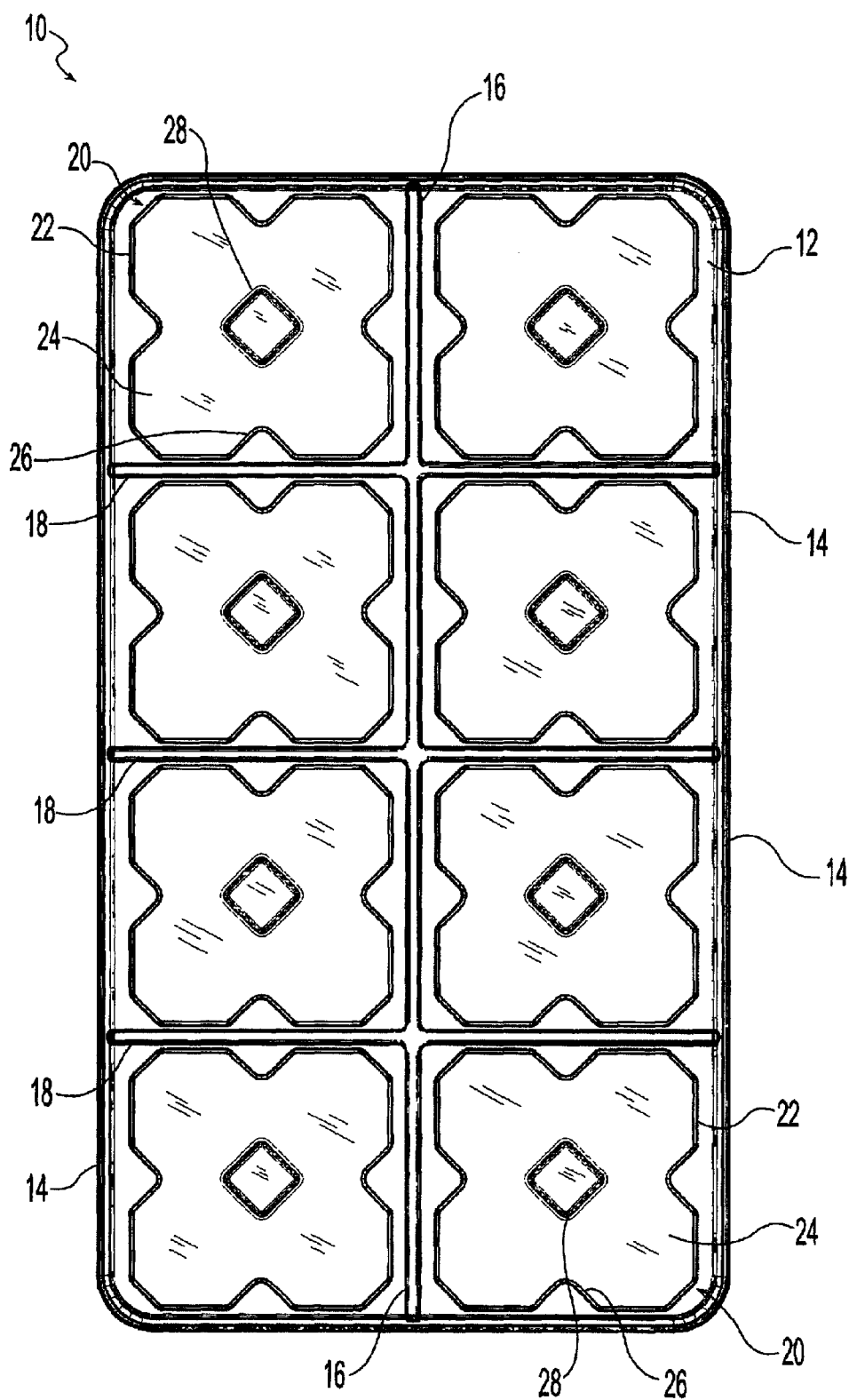
FIG. 4 is a bottom view of the baking tray of FIG. 1.
Figure 5A:
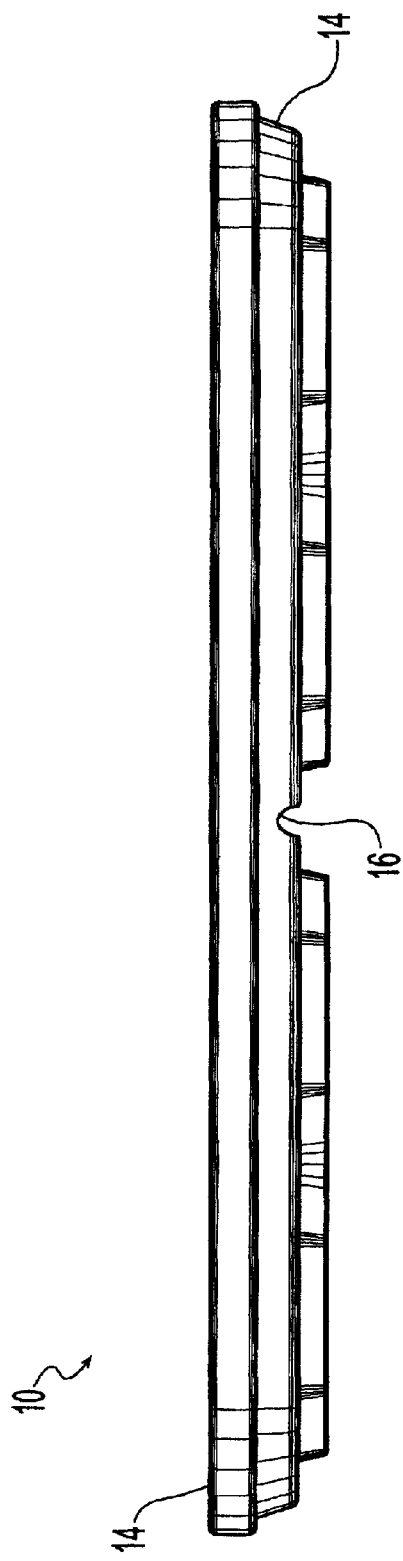
FIG. 5A is an end view, widthwise, of the baking tray of FIG. 1.
Figure 5B:
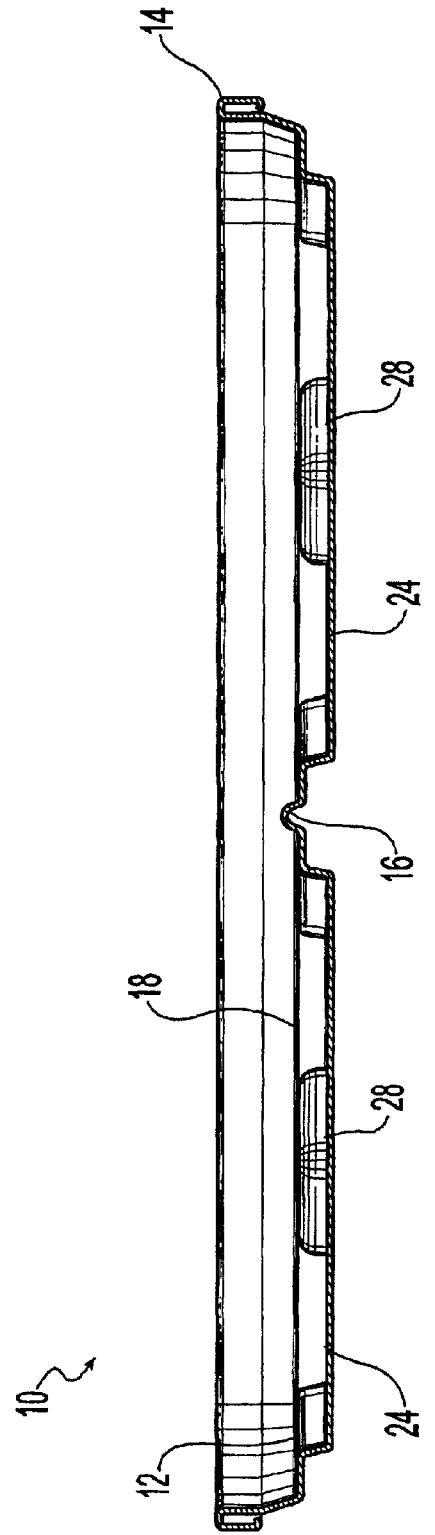
FIG. 5B is a cross-sectional view through the width of the tray of FIG. 1.

The present invention provides a baking tray useful for high volume industrial production of baked goods. As shown in FIG. 1, baking tray 10 comprises, in the broadest sense, a baking surface that incorporates a number of structural features that add strength, durability, and longevity to the tray. As best illustrated by FIGS. 1, 2, and 3, and according to an exemplary embodiment of the present invention baking tray 10 comprises a baking surface that is surrounded by perimeter band 14. Perimeter band 14 is typically fabricated from a separate piece of starting material and forms a wall that completely surrounds baking surface 12. As shown in FIG. 5b, the topmost portion of this band of material is rolled downward and away from the baking surface to form a rounded lip that defines the entire outer edge of the baking tray. Fabricating the outer edge of the tray in this manner imparts significant structural strength and stability to the baking tray. Perimeter band 14 may be fabricated from carbonized steel, aluminum, stainless steel, or any other suitable metal. The dimensions of perimeter band 14 may vary depending on the overall dimensions and physical characteristics of a particular type of tray.

As shown in FIGS. 1–4 and 5A and 5B, lengthwise support rib 16 is formed from the same material as baking surface 12 and extends upward from baking surface 12. Lengthwise support rib 16 runs the entire length of baking tray 10, and connects with perimeter band 14 on both ends of the baking tray. In the embodiment shown in the Figures, a plurality of widthwise support ribs 18 are also formed from the same material as baking surface 12 and extend upward from baking surface 12. These support ribs run the entire width of baking tray 10 and connect with perimeter band 14 on both sides of the baking tray. In a preferred embodiment of this invention, lengthwise support rib 16 and widthwise support rib 18 intersect at four points on the surface of baking tray 10. While the exemplary embodiment shown in the Figures includes a plurality of widthwise support ribs, other embodiments include at least one widthwise support rib that intersects with the lengthwise support rib and connects with perimeter band 14. Similarly, other embodiments of the present invention include a plurality of lengthwise support ribs 16.

The combination of perimeter band 14 and the various lengthwise and widthwise support ribs form a structural support system that makes baking tray 10 appreciably stronger and more durable than currently available industrial baking trays. Connecting the lengthwise and widthwise support ribs to the band of material surrounding the baking surface transfers stress experienced by the inner portion of the baking tray to the outer edge of the tray. Thus, the design of the tray minimizes physical stresses occurring across the surface of the tray and significantly reduces the likelihood of cracks or fractures. Furthermore, the intersecting rib and perimeter band design effectively reinforces the sheet metal of the baking surface, thereby reducing the tendency of the baking tray to warp as the result of repeated exposure to thermal stresses.

In addition to creating a structural support system, the intersection of the various support ribs also creates a plurality of baking subunits on the top surface of baking tray 10. In the exemplary embodiment shown in the Figures, there are eight of these baking subunits on the baking tray. Each of these baking subunits 20 further includes a dough receptacle 22 which is designed to accommodate dough for four baked products such as muffins, rolls, or sandwich buns. Each dough receptacle 22 is pressed into the top surface of baking tray 10 and further comprises four wells 24. As best illustrated by FIG. 2, each well 24 is partially separated from the other wells in each dough receptacle 22 by a plurality of protrusions 26 and a centrally located dividing member 28 which extends upwards from the surface of dough receptacle 22. When the tray is used for baking, the dough placed in each well 24 expands and meets the dough placed in the other wells. When baking is complete, a group of four baked products will be present in each dough receptacle.

The baking tray of the present invention may be manufactured from tin-plated steel, aluminized steel, carbonized steel, stainless steel, titanium, or any other suitable metal and may be formed by the known process of "drawing." The process of drawing involves forming the pan from a single sheet of material. Through a series of forming operation, the material is deformed or "drawn" to shape and define the desired baking units or subunits at predetermined locations on the sheet. If so desired by the user of baking tray 10, the tray may be covered or coated with certain materials, such as, for example, glazing material or other coating materials common to the baking industry.

What is claimed:

1. A baking tray, comprising:

(a) a baking surface;

(b) a band of material surrounding said baking surface, wherein said band of material is formed from a material different than the material of said baking surface, and wherein the topmost portion of said band of material band is rolled down and away from the baking surface to define the outer edge of the tray;

(c) at least one lengthwise support rib formed in said baking surface and running through said baking surface such that said support rib connects with said band of material at both ends of said baking tray; and (d) at least one widthwise support rib formed in said baking surface and running through said baking surface such that said widthwise support rib intersects said lengthwise support rib and connects with said band of material on both sides of said baking tray.

2. A baking tray, comprising:

(a) a baking surface;

(b) a band of material surrounding said baking surface, wherein the topmost portion of said band of material band is rolled down and away from the baking surface to define the outer edge of the tray;

(c) at least one lengthwise support rib formed in said baking surface and running through said baking surface such that said support rib connects with said band of material at both ends of said baking tray;

(d) at least one widthwise support rib formed in said baking surface and running through said baking surface such that said widthwise support rib intersects said lengthwise support rib and connects with said band of material on both sides of said baking tray; and (e) a plurality of baking subunits formed in said baking surface by said lengthwise support ribs and said widthwise support ribs, and wherein said baking subunits further comprise a dough receptacle, said dough receptacle further comprising a plurality of wells, and wherein said wells are partially separated from one another by protrusions in said baking surface and a dividing member located in the center of said wells.

3. The baking tray of claim 2, wherein said tray is fabricated from tin-plated steel, aluminized steel, carbonized steel, stainless steel, titanium or aluminum.

4. The baking tray of claim 2, wherein the surface of said tray is covered with glazing material.

* * * * *